United States Patent [19]

Ranney et al.

[11] 4,020,218
[45] Apr. 26, 1977

[54] POLYSULFIDE SEALANT AND CAULK COMPOSITIONS

[75] Inventors: Maurice W. Ranney, Rockland; Robert J. Pickwell, Westchester, both of N.Y.

[73] Assignee: Union Carbide Corporation, New York, N.Y.

[22] Filed: Mar. 27, 1975

[21] Appl. No.: 562,779

[52] U.S. Cl. .................. 428/447; 427/407 A; 427/407 R; 427/409; 428/429

[51] Int. Cl.² .................. B32B 27/06; B32B 9/04; B05D 1/36

[58] Field of Search .......... 427/407, 409; 156/329, 156/314, 315; 428/447, 429, 450; 260/448.8 R, 448.2 N

[56] References Cited

UNITED STATES PATENTS

| | | | |
|---|---|---|---|
| 3,123,495 | 3/1964 | Carpenter et al. | 428/429 X |
| 3,297,473 | 1/1967 | Bulbenko | 428/419 |
| 3,312,669 | 4/1967 | Giordano | 428/344 X |
| 3,457,099 | 7/1969 | De Angelo et al. | 427/407 X |
| 3,481,815 | 12/1969 | Barry et al. | 156/329 |
| 3,922,436 | 11/1975 | Bell et al. | 427/407 X |

*Primary Examiner*—James R. Hoffman
*Attorney, Agent, or Firm*—George A. Skoler

[57] ABSTRACT

This invention relates to enchancing the bonding of polysulfide sealants to a variety of inorganic substrates, most particularly, to metal, ceramic, concrete, and glass substrates. This improved bonding of sealant is achieved by the use of a silane adhesion promoter which is characterized by the following formula:

$$R - SiX_3$$

wherein R is a norbornenyl, bicyclopentenyl, or a mercaptonorbornyl containing radical, and "X" is a hydrolyzable group.

7 Claims, No Drawings

POLYSULFIDE SEALANT AND CAULK COMPOSITIONS

THE PRIOR ART

Polysulfide polymers are old in the art. Their production is characterized by Fettes and Jorczak, Industrial and Engineering Chemistry, November 1950, on pages 2217 – 2223. Many patents have been issued covering them and their manufacturer, such as Patrick et al, U.S. Pat. No. 2,466,963, patented Apr. 12, 1949, and U.S. Pat. No. 2,485,107, patented Oct. 18, 1949, both assigned to Thiokol Corporation. Other patents relating to manufacture of polysulfide polymers are the following:

| Patent No. | Date of Issue |
|---|---|
| 2,049,974 | Aug. 4, 1936 |
| 2,100,351 | Nov. 30, 1937 |
| 2,142,144 | Jan. 3, 1939 |
| 2,142,145 | Jan. 3, 1939 |
| 2,195,380 | Mar. 26, 1940 |
| 2,206,641 | July 2, 1940 |
| 2,206,642 | July 2, 1940 |
| 2,206,643 | July 2, 1940 |
| 2,216,044 | Sept. 24, 1940 |
| 2,221,650 | Nov. 12, 1940 |
| 2,235,621 | Mar. 18, 1941 |
| 2,255,228 | Sept. 9, 1941 |
| 2,278,127 | Mar. 31, 1942 |
| 2,278,128 | Mar. 31, 1942 |

The commercial use of polysulfide polymers in the manufacture of sealants and caulking composition has been long known and commercially used. This point is clearly indicated from the following U.S. patents: Bulbenko, U.S. Pat. No. 3,297,473, patented Jan. 10, 1967, Giordano, U.S. Pat. No. 3,312,669, patented Apr. 4, 1967, Plueddemann, U.S. Pat. No. 3,317,461, patented May 2, 1967; Carpenter et al., U.S. Pat. No. 3,123,495, patented Mar. 3, 1964.

Polysulfide polymers which are suitable for use in the manufacture of such sealants and caulks include the mercapto terminated polysulfide polymers sold by Thiokol, the Dion polymercaptans sold by Diamond Chemicals, a division of Diamond Shamrock Corporation, and the polymercaptans sold by Phillips Petroleum Company.

These polymers are made into caulks and sealants in a conventional manner using fillers and other additives, as well as curing agents. A wide range of oxidizing agents which oxidize terminal mercaptan groups of the polymer to extend them by forming them into extending disulfide bonds, can be used. These oxidizing agents are called curing agents. The most widely employed curing agents are lead dioxide, manganese dioxide, and calcium peroxide.

It has been known for a long time that polysulfide sealants do not effectively adhere under conditions of high moisture to inorganic surfaces, such as glass, ceramic, concrete or metal surfaces without the use of a silane adhesion promoter. Such silane adhesion promoters are characterized, in the typical case, as organo hydrolyzable silanes in which the organo groups possess a functional radical or group which is capable of inter-reacting with the mercapto groups associated with polysulfide polymers. Illustrative organo silanes which have been commercially employed as silane adhesion promoters in polysulfide sealant and caulking compositions are: vinyl-tris(2-methoxyethoxy)-silane (hereinafter called "A-172"), gamma-aminopropyltriethoxysilane (hereinafter called "A-1100"), gamma-mercaptopropyltrimethoxysilane (hereinafter called "A-189"), beta-mercaptoethyltriethoxysilane (hereinafter called "A-1893"), gamma-glycidyloxypropyltrimethoxysilane (hereinafter called "A-187"), and beta-(3, 4-epoxycyclohexyl) ethyltrimethoxysilane (hereinafter called "A-186"). The aforementioned Bulbenko, Giordano, Plueddemann and Carpenter et al. patents discuss the utilization of organo silanes as adhesion promoters for polysulfide sealants. For example, of the organo silanes depicted in the Carpenter et al. patent none have been found in subsequent work to consistently behave as an effective adhesion promoter when tested under high moisture conditions. That is to say, the adhesion promoters which are depicted in the Carpenter et al patent have not been found to provide uniform results from batch to batch of polysulfide polymer sealant or caulking composition and as a result the most widely employed of the silane adhesion promoters in commercial activities are the two epoxy silanes and the two mercapto silanes recited above. Those particular silanes have proven to be highly effective as silane adhesion promoters in that they promote high levels of adhesion of the sealant to the substrate when used as a primer of integrally blended into the polysulfide sealant or caulking compositions.

There is always a commercial need for different silane adhesion promoters in enhancing the adhesion of polysulfide polymer sealants and caulks. There is described herein the utilization of silane adhesion promoters which heretofore have not been utilized in polysulfide sealant and caulking compositions and which provide repeatedly good adhesion when used as a primer or when integrally blended into the compositions.

THE INVENTION

This invention is concerned with polysulfide polymer compositions useful as sealants and caulks to inorganic substrates which contain a silane adhesion promoter which is a polysulfide substituted silane having the following formula: R — SiX$_3$ wherein R is a norbornenyl, bicyclopentenyl, or mercaptonorbornyl containing radical, and X is a hydrolyzable group.

This invention constituted an improvement in the manufacture and use of polysulfide sealant and caulk compositions. This invention involves the direct substitution of the aforementioned silanes for the organo silanes which have heretofore been used as adhesion promoters for such sealant and caulk compositions. In that respect, this invention utilizes the conventional technology of this art in the formulation of such sealants and caulks as well as their applications to inorganic substrates, such as concrete, brick, ceramic, glass and metal surfaces. To effect this invention one simply substitutes the aforementioned silanes for the silane adhesion promoters previously utilized in the art. In that regard, there is incorporated by reference the disclosure at Column 1, lines 68–71 and Column 2, Lines 1–68, inclusive, of U.S. Pat. No. 3,312,669 mentioned above.

A typical sealant composition useful in the practice of this invention is characterized by the following formulations:

|                              | Sealants |      |
|------------------------------|----------|------|
| Part A                       | I        | II   |
| Thiokol™ LP-32               | 100      | 100  |
| Barytes                      | 110      | —    |
| Titanium Dioxide             | 10       | 10   |
| Aluminum Powder              | 5        | —    |
| Silica                       | 40       | —    |
| Activated Calcium Carbonate  | —        | 25   |
| Stearic Acid                 | —        | 1    |
| Epok™ Resin J498             | 10       | —    |
| Dimethylol-p-cresol          | —        | 0.3  |
| A-172                        | 4        | —    |
| A-1100                       | —        | 2    |
| Part B                       |          |      |
| Lead Dioxide                 | 10       | 10   |
| Dibutyl Phthalate            | 9        | 9    |
| Stearic Acid                 | 1        | 1    |

The above formulation is characteristic of a conventional two-package sealant composition, see Compositions I and II at col. 3 of U.S. Pat. No. 3,123,495, the disclosure of which is incorporated by reference. Another conventional two-part composition is characterized at column 3, starting at line 21 to line 75 of U.S. Pat. No. 3,212,669. Such formulations can be employed in the practice of this invention. At columns 3–5, inclusive, U.S. Pat. No. 3,123,495 discusses a number of sealant compositions and each one is incorporated herein by reference. However, with respect to each of those formulations of the aforementioned patents, the only difference with them and this invention is that in the practice of this invention thee is substituted for those silane adhesion promoters recited in the formulations the norbornenyl and mercaptonorbornyl substituted silanes of this invention.

In a one package system, the sealant composition contains the curing agent so that when the sealant is used, it can be used directly from a single package which avoids the mixing of two ingredients, to wit, polysulfide polymers and fillers and stabilizers, etc., and a separate package comprising a curing agent.

The curing agent used in the one package system is a latent curing agent which has a relatively long shelf life when kept moisture free. However, when the catalyst (such as calcium peroxide) are activated by moisture, the cure of the sealant is initiated. This occurs when the sealant is removed from the package and applied to the substrate for sealing a joint or joints.

Illustrative of a typical one or single package white polysulfide sealant formulation is the following taken from U.S. Pat. No. 3,225,017:

| Thiokol™ LP-2                     | 100 parts         |
|-----------------------------------|-------------------|
| Titanium Dioxide                  | 18                |
| Calcium Carbonate (Multiflex™ MM) | 45                |
| Dibutylphthalate                  | 15                |
| 80% ERL-2774 Epoxy in MEK         | 5                 |
| Calcium Peroxide (60%)            | 10                |
| Barium Oxide                      | 10                |
| (Calcium Hydroxide)               | 2.5 Thiokol       |
|                                   | Recommendation    |

Another typical polymercaptan single component sealant formulation taken from U.S. Pat. No. 3,618,760 is as follows:

| Ingredient        | Parts |
|-------------------|-------|
| Polymercaptan base| 100   |
| A-189             | 1 to 1.5 |
| TiO$_2$           | 15    |
| Thixotropic Agent (Thixin™ R) | 4 |
| Calcium Carbonate (Supermultiflex™) | 75 |
| Molecular Sieve 4A | 1 to 5 |
| Dioctylphthalate  | 7     |
| Calcium Peroxide curing agent | 5 |

Typical of the properties of polysulfide polymers used in such sealant formulas are the following properties of Thiokol LP polymers.

| PROPERTIES OF THIOKOL LP (REG. T.M.) POLYMERS | | | | |
|---|---|---|---|---|
| Polymer | LP-2 | LP-12 | LP-31 | LP-32 |
| Average Molecular Weight | 4,000 | 4,000 | 8,000 | 4,000 |
| Viscosity, Poises, 80° F | 400 | 400 | 800–1400 | 400 |
| Water, % | 0.1–0.2 | 0.2max. | 0.1–0.2 | 0.1–0.2 |
| Thiol (SH) Content, max. | 2.2 | 1.8 | 1.1 | 2.0 |
| Percent Crosslinking Potential | 2.0 | 0.1 | 0.5 | 0.5 |

In the making of a sealant formula certain knowledge is commonly recognized. For example, sulphur also functions as an activator for lead dioxide curing. Up to 0.5 parts of sulfur is used in some recipes. The effect of sulphur is to decrease the set time of sealant compounds, increase the modulus and hardness, and to improve the compression set. However, too much sulfur can be used and amounts appreciably above 0.5 parts per hundred cause excessive softening and sometimes sulfur in excess of 0.2 parts per hundred markedly decreases adhesion of LP-2 based sealant compounds.

The cure rate is dependent to some extent on humidity and temperature. At room temperature, say 80° F. (26.7° C.) and 50% relative humidity, an LP-2 based compound catalyzed with lead peroxide will normally have a working life of 3 or 4 hours and become fully cured in 24 hours. Increases in temperature and humidity obviously accelerate the cure rate.

Manganese dioxide is also used to some extent for curing polysulfide sealant compounds. This catalyst is extremely sensitive to the presence of phenolic derived adhesion additives and other acidic ingredients. This limits its use in sealants. Generally, about 6 parts of manganese dioxide is recommended for each hundred parts of polysulfide base. The addition of 0.5 parts of stearic acid is recommended to increase the working life by about 2 hours.

Calcium peroxide should be used as a curing agent when preparing light colored sealants. The fact that calcium peroxide is moisture activated makes it an excellent curing agent for the preparation of single package sealants, and it is apparently the only curing agent commonly used in those systems. Naturally, moisture must be avoided in compounding single package sealants containing calcium peroxide until ready to activate the peroxide and promote the crosslinking reaction. Approximately 10 parts of calcium peroxide are used for each hundred parts of polymer. This use of calcium peroxide as a curing agent is disclosed in U.S. Pat. No. 3,225,017.

Since the calcium peroxide requires moisture for initiation, moisture can be considered an essential element to obtaining satisfactory cures. After extrusion or application of the sealant, humidity and moisture transmission play a large part in regulating the rate of cure. At conditions of low humidity, days and weeks may be required to complete the cure, maybe as long as 30 days. At 100% relative humidity, cure is appreciably faster, a few days usually being sufficient, although there is some reason to suspect that some compounds respond differently since various additives can affect the rate of water vapor transmission through the sealant. Size and shape of the specimen also affect the rate of water vapor transmission and therefore the rate of cure.

Generally speaking, a finished polysulfide sealant contains the following ingredients:
(A) 1. Liquid Polysulfide polymer, for example Thiokol LP-2, LP-31, or LP-32.
2. Fillers as silica, calcium carbonate, carbon black.
3. Sulfur
4. Retarders to control working life time.
(B) 1. Plasticizers
2. Oxidizing or crosslinking agent
3. Pigment (if desired)

Further illustrative of recipes for two-part polysulfide sealants is the following:

| Part A | | Black | Tan |
|---|---|---|---|
| LP-2 Polymer | | 100 | 100 |
| Fillers | | | |
| Multiflex MM | | 5 | |
| Icecap K | | | 25 |
| Titanox RA-50 | | | 30 |
| SRF No. 3 Carbon Black | | 30 | |
| Thixotropic Agents | | | |
| Attagel L-20 | | 3 | |
| Cabosil MS-5 | | | 2 |
| Cure Control | | | |
| Sulphur | | | 0.1 |
| Retarder | | | |
| Stearic Acid | | 1 | |
| Plasticizer | | | |
| Dibutylphthalate | | 35 | |
| Tackifiers | | | |
| Methylon 75108 Phenolic | | | 5 |
| Durez 10694 | | 5 | |
| Part B | | | |

| Part A | | Black | Tan |
|---|---|---|---|
| Curing Agent | | | |
| PbO$_2$ | | 7.5 | 7.5 |
| Plasticizer | | | |
| Dibutylphthalate | | 7.5 | 7.5 |

Instructions: Mix A and B to maintain 7.5 parts PbO$_2$ to 100 parts LP-2.

One particular commercial two-part system is the following:

| | Ingredient | Parts |
|---|---|---|
| Part A | Thiokol LP-2 | 100 |
| | Winnofil S (Stearate coated CaCO$_3$) | 45 |
| | TiO$_2$RLL | 15 |
| | Silane A-187 | 3 |
| | Thixseal A (Baker) | 4 |
| | Santicizer 278 (Monsanto) | 25 |
| | Stearic Acid | 1 |
| Part B | MnO$_2$ | 10 |
| | Santicizer 278 (Monsanto) | 10 |

Single package formulations are similar, using however carefully dried, almost anhydrous or calcined fillers, avoiding excess acidity, and also using approximately 10 parts of calcium peroxide directly in the formulation in place of lead dioxide as above. Calcium hydroxide is frequently added, about 2.3 parts per hundred polysulfide base, to insure a neutral pH and prolonged package life.

Suitable fillers for use in the manufacture of sealant compositions covered by this invention are set forth in Table I below.

TABLE I

MINERAL AND BLACK FILLERS FOR LP LIQUID POLYSULFIDE COMPOUNDS

| Filler | Composition | Spec. Gr. | Particle Size (microns) | pH | %, Free Moisture | Supplier |
|---|---|---|---|---|---|---|
| Pelletex (SRF No. 3) | Pelleted semi-reinforcing furnace | 1.80 | 0.08 | 8.5 | 1.0 | Cabot Corporation, Boston, Mass. |
| Sterling MT | Medium thermal | 1.80 | 0.46 | 9.5 | 0.5 | Cabot Corporation, Boston, Mass. |
| Calcene TM | pp'td calcium carbonate (coated) | 2.55 | 0.07 | 9.0–9.7 | 0.4 | Pittsburgh Plate Glass Co., Phila. |
| Multifex MM | pp'td calcium carbonate | 2.65 | 0.06 | 9.0 | 0.5 | Diamond Alkali Co., Cleveland, Ohio |
| Witcarb RC | pp'td calcium carbonate (coated) | 2.55 | 0.06 | 7.3–7.5 | 2.0 | Witco Chemial Co., New York, N.Y. |
| York White | Dry ground Limestone | 2.71 | 5–10 | 9.4–9.7 | — | R.E. Carroll Inc., Trenton, N.J. |
| Celwhite | Wet ground calcium carbonate | 2.71 | 5 | 9.0–9.5 | — | The Georgia Marble Co., Tate, Ga. |
| OMYA BSH | Surface-treated chalk (1%stearic acid) | 2.70 | 1–3 | 7.0 | 0.1 | Pluess-Staufer (North American), Inc. New York, N.Y. |
| Icecap K | Anhydrous calcine clay | 2.63 | 1.0 | 5.0–6.0 | 0.5 | Burgess Pigment Co., Sandersville, Ga. |
| Cabosil | Fumed silica-99% SiO$_2$ | 2.2 | 0.015 | 3.5–4.2 | 1.0 | Cabot Corporation, Boston, Mass. |
| HiSil 233 | pp'td silica-87% SiO$_2$ | 2.0 | 0.02 | 6.5–7.3 | 6.0 | Pittsburgh Plate Glass Co., Phila. |
| Permolith 40M (lithopone) | 20% Zinc sulfide .71% barium sulfate | 4.3 | 99.8% thru 325 mesh | 8.0–9.0 | — | The Sherwin Williams; Co., Chicago, Ill. |
| Blanc Fixe | pp'td barium sulfate | 4.4 | 0.18 | 8.8–9.5 | 0.3 | The C.P. Hall Co., Akron, Ohio |
| Titanox RA-50 | Titanium dioxide | 4.1 | 0.3 | 7.0–8.0 | 0.7 | Titanium Pigment Corp., New York, N.Y. |
| Superlith XXXHD | Pure zinc sulfide | 4.1 | 99.97% thru 325 mesh | 7.1 | — | C.J.Osborn Co., Linden, N.J. |
| Aluminum flake 422 | Aluminum powder | 2.5 | 100% thru 325 mesh | — | — | Van Horn, Metz and Co., Inc., Conshohocken |

The amounts of these fillers one uses in sealant and caulk formulae are characterized above in the sealant formulae and in the aforementioned patents which constitutes the prior art.

The silane adhesion promoters of this invention encompass silanes having the formula R—SiX$_3$ wherein R and X are as above defined. One class of such silanes are those of the formula

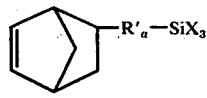

wherein X is as above defined, a is 0 or 1, and R' is

—CH—, —CH$_2$CH$_2$—, —CH$_2$—, or —CHCH$_2$—.
 |
 CH$_3$

Another class of such silanes are those of the formula

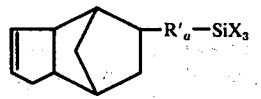

wherein R', X and a are defined above. The third class of such silanes are those of the formula (HS)$_b$-R''-SiX$_3$ wherein b is 1 or 2, X is defined above, R'' is one of the polyvalent cycloaliphatic hydrocarbon radicals characterized as follows:

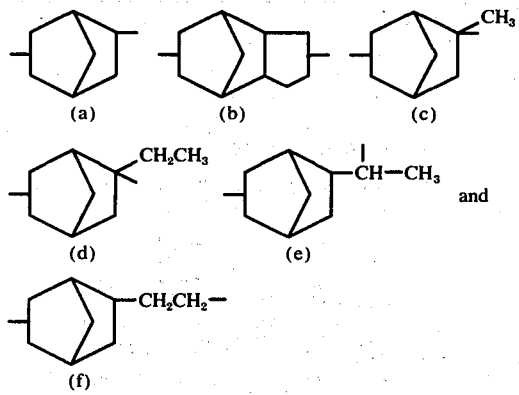

and when b is two, the two mercapto groups are attached to separate carbon atoms and such carbon atoms are adjacent to one another (or vicinal to each other).

Illustratives of silanes which are covered by this invention are those which are characterized by the following formula:

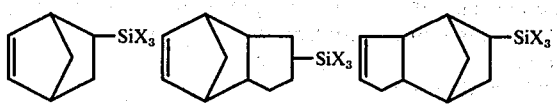

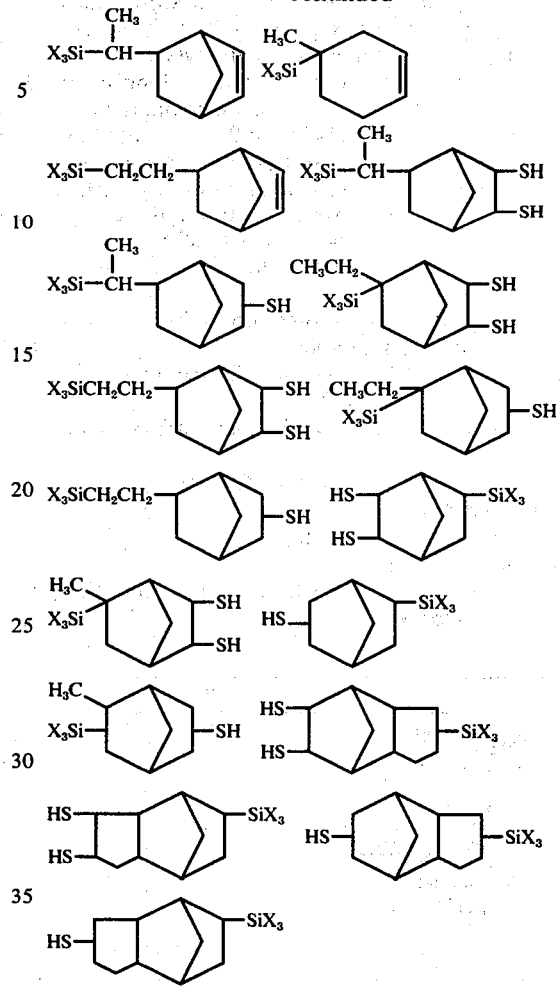

Illustrative of X, that is, the hydrolyzable radicals are chlorine, alkoxy (e.g., methoxy, ethoxy, n-propoxy, isopropoxy, n-butoxy, methoxy- or ethoxyethoxy, beta-chloropropoxy, beta-chloroethoxy, and the like) acetoxy, and the like.

The amount of the silane adhesion promoter which is incorporated into a sealant or caulking formulation, a technique called "integral blending", may range from as little as 0.01 weight % to about 6 weight %, based on the total weight of the composition, preferably from about 1 weight % to about 5 weight % based on the total weight of the sealant or caulking composition.

The amount of silane which is used in priming a substrate before coating the sealant or caulk to the substrate is that amount of silane which is capable of enhancing the adhesion of the caulk or sealant to the substrate. No amount is regarded to be critical. However, one should attempt to avoid putting down too thick a layer of silane to a substrate since this will cause the sealant or caulk to form a weaker adhesion boundary layer where it contacts the substrate or where the coating contacts the sealant or caulk. Usually, a solvent solution of the silane is applied to the substrate followed by evaporation of the solvent to leave behind a substrate which is primed with the silane.

It is important to appreciate that the amount of the silane which is used regardless of whether the technique for adhesion promotion is integral blending or priming should be sufficient to enhance the adhesion of the sealant or caulk to the substrate under all conditions of intended on expected use.

It should be recognized that the surfaces of the substrate should be properly cleaned prior to applying either the primer or the sealant or caulk containing the silane adhesion promoter.

Two commercially available polysulfide sealant compositions were used in the following experiments. They were single-package, cartridge type sealants, obtained directly from the manufacturers. Two different colors of sealant, black and gray, representing the two different manufacturers used. The adhesion-promoting silanes were examined in the selected polysulfide sealants by blending 2% by weight of the silane into portions of the sealant weighed out in suitable glass screw-cap jars. After thorough mixing with a clean spatula, portions of the sealant were applied to cleaned glass and aluminum test panels. Other portions of the same material were tightly sealed in jars for future tests involving long term stability on storage. The entire weighing and mixing sequence was performed in a standard glove box under an atmosphere of dry argon gas to prevent exposure of the material to moisture and consequent premature curing. The application step was carried out in the open on the laboratory bench.

EXAMPLE 1

The following method was used for cleaning the test panels:

1. The aluminum panels were degreased with methylethylketone solvent and allowed to dry.

2. The aluminum was thoroughly rubbed with 00 grade steel wool to remove oxide layers and then washed with a water solution of Alconox laboratory detergent abrasive cleaner until completely wetted by a film of water which after draining, left a film of water on the surface.

3. The panels were immersed in distilled water, drained, blotted with paper towels and allowed to dry in a horizontal position at room temperature in a 50% relative humidity atmosphere for several hours.

Similarly, glass test panels were cleaned as follows:

1. The glass was scrubbed with Ajax cleanser on a cloth pad until dipping in water and draining showed a flow-off of the water as a film rather than droplets.

2. The panels were rinsed in distilled water, blotted with clean paper toweling, and allowed to dry in a horizontal position at room temperature in a 50% relative humidity atmosphere for several hours.

These preparation procedures exceed the requirements of Federal Specification TT- S000227E for sealing compounds.

The capped samples of sealant containing integrally blended sealants were removed from the glove box. A small portion of the sealant was removed from the jar and applied to the cleaned test panels in strips, using a clean spatula to form the strips. Additional jars of sealant containing integrally blended coupling agents were removed from the dry box and the covers tightly sealed with polyethylene tape and set aside for further testing after various periods of storage.

The test panels with their applied strips of sealant containing integrally blended silane adhesion promoters were removed from the glove box and allowed to stand overnight on the laboratory bench top at ambient conditions ($\approx$20-25° C.), followed by three weeks exposure to 100% relative humidity at room temperature. The adhesion was examined after this initial three-week cure, then the test panels were immersed in tap water and tested after seven days immersion, again after thirty days immersion in the tap water at room temperature, and then after six months immersion. Also, after six months storage, the unused, stored portions of the sealants containing integrally blended silanes were identically retested.

The adhesion of the cured sealant beads to the test panels was measured by partially stripping the cured sealant from the substrate and noting whether failure was adhesive at the substrate surface, indicating poor adhesion, or cohesive within the sealant, indicating the bond to the substrate was desirably stronger than the cohesive forces within the cured sealant.

Experimental

One gram of the silanes listed below were thoroughly blended into 50 grams of each of the selected black and gray colored commercial polysulfide based sealant under conditions of less than 150 parts per million of moisture in a suitable glove box. Portions of each of the mixed sealants were applied to both glass and aluminum test panels and the panels were allowed to cure overnight on the bench top, followed by three weeks curing at room temperature, 100% relative humidity. On testing of each sealant at this point, there was no adhesive failure, only cohesive failure of the well cured sealant, illustrating excellent adhesion. Similarly, after one week and four week water immersion periods, the samples also showed only cohesive failure indicating good adhesion to the unprimed test panels. There was no evidence of cure interference on a six month storage test when the samples were retested. The same two commercially available sealants without the addition of the silanes and similarly applied to glass and aluminum test panels showed complete adhesive failure as the sealant was easily stripped from the substrates.

SILANES TESTED

1. Norbornenyltrimethoxysilane
2. 2 (or 3) mercapto-5-trimethoxysilyl bicyclo-(2,2,1) heptane
3. Norbornenylethyltrimethoxysilane
4. 2 (or 3) mercapto-5-trimethoxysilylethylbicyclo-(2,2,1) heptane.

EXAMPLE 2

The method employed for the testing and evaluation of all silane compounds in this example is described below:

The silane primer materials were examined by applying 5 weight % concentrations of the silane adhesion promoter cited below in a 90 weight % SD-3A (denatured) ethanol to 10 weight % water solution, to suitably cleaned and dried (as described in Example 1) glass and aluminum panels as test substrates, allowing several hours to dry at room temperature, about 50% relative humidity.

The various alcohol/water silane solutions were applied on the panels by brushing with a clean camels hair brush which had been dipped into the primer solution and lightly drained by touching the rim of the storage bottle container. The primed panels were then placed flat on a benchtop and allowed to dry for 3 or 4 hours at room temperature, about 50% relative humidity.

Four commercially available polysulfide sealant compositions were used in these evaluations. They were single-package, cartridge type sealants, obtained directly from the manufacturer. Four different colors of sealant, limestone, tan, gray, and bronze sealants representing two different manufacturers were used. The sealant was applied to the test panels as beads of sealant extruded from the standard hand-held type caulking gun to provide uniform, smooth, ⅜ inch diameter beads of material running the full length of the 6 inch long panels.

The sealant was allowed to dry overnight at room temperature at about 50% relative humidity, followed by three weeks exposure to 100% relative humidity at room temperature ($\approx 20°$–$25°$ C.). The adhesion was examined after this initial three-week cure, then the test panels were immersed in tap water and test after 7 days immersion, and again after 30 days immersion in the tap water at room temperature.

The adhesion of the cured sealant beads to the test panels was measured by partially stripping the cured sealant from the substrate and noting whether failure was adhesive at the substrate surface, indicating poor adhesion, or cohesive within the sealant, indicating the bond to the substrate was desirably stronger than the cohesive forces within the cured sealant.

Experimental

Panels of the cleaned glass and aluminum were primed with the 5% solutions in SD-3A alcohol/water of the silanes and allowed to dry for several hours. Beads of the limestone, tan, bronze, and gray commercial polysulfide-based sealant were applied to the primed panels. After curing 3 weeks room temperature, 100% relative humidity, there was no adhesive failure, only cohesive failure illustrating good adhesion with each panel. Similarly, after 1 week and 4-week water immersion periods, the sample peel tests showed only cohesive failure indicating good adhesion of the sealant to the primed test panels. The same four commercially available sealants similarly applied to cleaned unprimed glass and aluminum substrates (test panels) showed complete adhesive failure in that the sealant beads were easily stripped from the unprimed glass and aluminum surfaces

SILANES TESTED

1. Norbornenyltrimethoxysilane
2. 2 (or 3) mercapto-5-methoxysilyl bicyclo-(2,2,1) heptane
3. Norbornenylethyltrimethoxysilane
4. 2 (or 3) mercapto-5-trimethoxysilylethylbicyclo-(2,2,1) heptane.

What is claimed is:

1. The process for enhancing the bonding of polysulfide sealant or caulks to solid inorganic substrates which comprises providing at the interface of the substrate and the sealant or caulk a silane or its hydrolyzate or condensate of the formula

wherein R is a bicyclopentenyl or mercaptonorbornyl containing radical, and X is a hydrolyzable group comprised of chlorine, alkoxy or acetoxy radicals.

2. The process of claim 1 wherein R is a bicyclopentenyl containing radical.

3. The process of claim 2 wherein the silane has the formula

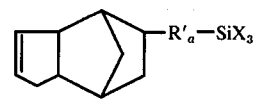

in which R' is $$-CH-,\ -CH_2CH_2-,\ -CH_2-,\ \text{or}\ -CHCH_2-,$$
$$\underset{CH_3}{|}$$

X is a hydrolyzable group comprised of chlorine, alkoxy or acetoxy radicals, and $a$ is 0 or 1.

4. The product of the process of claim 2.

5. The process of claim 1 wherein R is a mercaptonorbornyl containing radical.

6. The process of claim 5 wherein the silane has the formula

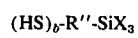

in which $b$ is 1 or 2, X is as defined, R'' is one of the polyvalent cycloaliphatic hydrocarbon radicals of the formula

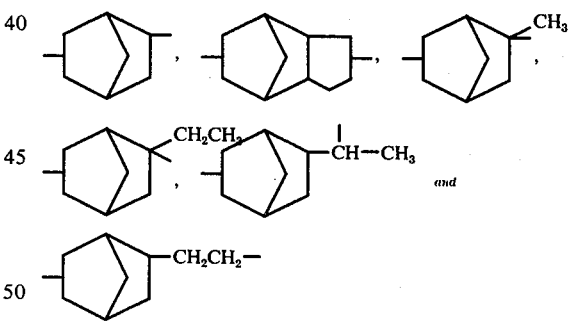

and when $b$ is two, the two mercapto groups are attached to separate carbon atoms and such carbon atoms are adjacent to one another.

7. The product of the process of claim 5.

* * * * *

UNITED STATES PATENT OFFICE
CERTIFICATE OF CORRECTION

Patent No. 4,020,218        Dated April 26, 1977

Inventor(s) Maurice W. Ranney, Robert J. Pickwell

It is certified that error appears in the above-identified patent and that said Letters Patent are hereby corrected as shown below:

Col 2, Line 28, after "primer","of"should read -- or --.

Col. 3, Line 31, after "invention", "thee" should read -- there --.

Col. 3, Line 67, column heading, "Ingrediment" should read --Ingredient --.

Col. 11, Line 16, after "tap water and", "test" should read --tested--.

Signed and Sealed this

Fourth Day of July 1978

[SEAL]

Attest:

RUTH C. MASON  
Attesting Officer

DONALD W. BANNER  
Commissioner of Patents and Trademarks